Jan. 1, 1935.  J. E. LILIENFELD  1,986,779
ELECTROLYTIC CONDENSER AND ELECTROLYTE THEREFOR
Filed Feb. 14, 1934
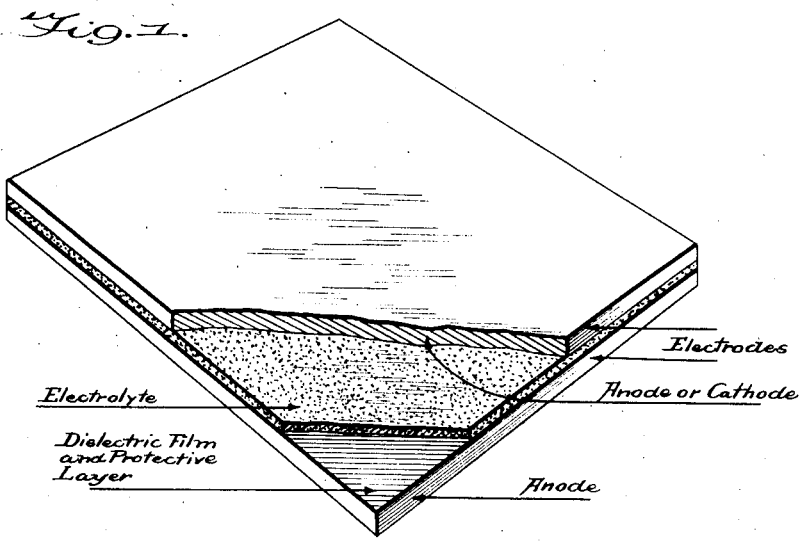
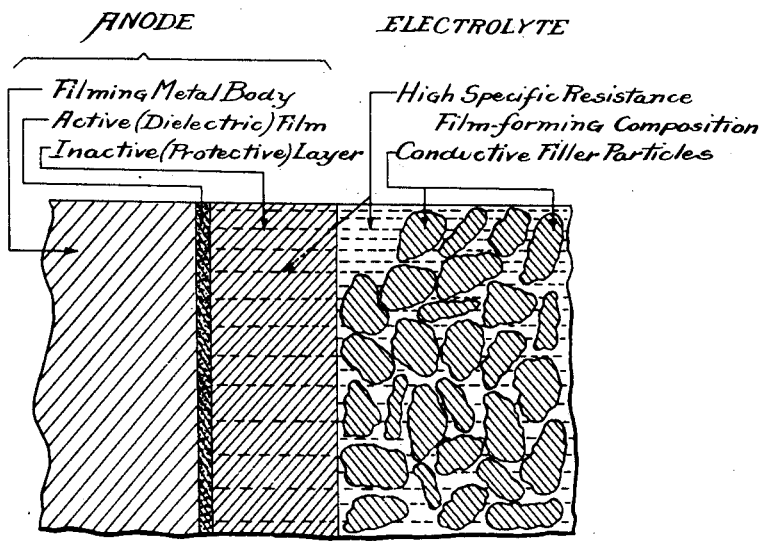
Inventor.
Julius Edgar Lilienfeld,
By Emery, Booth, Varney & Holcombe
Attorneys Patented Jan. 1, 1935

1,986,779

UNITED STATES PATENT OFFICE 1,986,779

ELECTROLYTIC CONDENSER AND ELECTROLYTE THEREFOR

Julius Edgar Lilienfeld, Winchester, Mass., assignor to Ergon Research Laboratories, Inc., a corporation of Delaware Application February 14, 1934, Serial No. 711,286

38 Claims. (Cl. 175—315)

My invention relates to electrical devices having anode members of a filmed metal in association with an electrolyte possessing novel characteristics as hereinafter set forth. More particularly, my invention relates to electrolytic condensers, with especial reference to a semi-dry plastic type of electrolyte for employment therein.

This application is in part a continuation of my copending applications Serial Nos. 560,140 and 560,142, both filed August 29, 1931, and Serial No. 670,084, filed May 9, 1933.

An object of my invention is to provide an electrolytic condenser suitable for operation on alternating currents without the use of an externally applied bias, and which has the characteristics of being operable for indefinitely long periods of time, either continuously or with idling periods, without heating or appreciable deterioration taking place.

A further object is to provide an electrolytic condenser which can be continuously operated for indefinitely long periods of time at direct or alternating voltages of 100–440 and higher across opposing electrodes, with an extremely low current leak, low power loss, freedom from sparking, absence of appreciable deterioration, and good self-healing properties.

In connection with alternating current use, a feature of my condensers is that no appreciable distortion of wave form is caused. Oscillograph measurements show no visible distortion of wave form.

A feature of my invention is the low cost of constructing condensers in accordance therewith.

Condensers constructed in accordance with my invention can, for the above reasons, be used commercially for power factor correction with great success, an objective which has long been sought in the art.

With especial reference to electrolytes as such, an object of my invention is to provide a non-flowing adhesive and cohesive electrolyte which can be readily applied to foil electrodes in the form of a thin sheet serving both as an electrolyte and as sole spacing and securing means between adjacent electrodes. A feature is that no retaining means are necessary to maintain the electrolyte between the electrodes.

A further object is to provide an electrolyte which will not dry out or deteriorate when exposed to the atmosphere, thus making unnecessary a sealed casing for the assembled electrodes and electrolyte.

Many other objects and features will be evident as the description progresses.

In the accompanying drawing,

Fig. 1 shows a perspective view of a condenser unit comprised of two electrodes and an interposed electrolyte, partly broken away to show details of construction; and Fig. 2 shows diagrammatically a greatly magnified cross-section of an anode and electrolyte combination, in the region of their junction.

As my electrolyte has been developed with especial reference to use in combination with a particular type of anode, I will first briefly describe the latter in order that my full invention may be understood and appreciated.

The anode, illustrated in Fig. 2, is formed of filming metal, such as aluminum or tantalum, characterized by having a double-layer face. The layer next to the metal surface comprises an "active" dielectric film and is of the type produced by electrolyzing the anode metal in a solution of boric acid and borax, or the like, in the well known manner. In the case of aluminum, this proximate film consists of a thin layer of highly insulating aluminum oxide having a thickness of the order of magnitude of $10^{-4}$ to $10^{-5}$ mm. A property of such films is that their thickness is determined by the maximum voltage applied in forming, the limit imposed by the voltage not being exceeded even though the voltage is applied for an unlimited period of time. My belief is that a film of this character consists of highly organized and associated aluminum oxide molecules, produced from the initially formed aluminum hydroxide molecules by the action of the high intensity electrostatic field existing at the surface of the anode during the forming operation, and that these aluminum oxide molecules become interlinked in such a way as to resist conversion into the hydroxide form through introduction of hydroxyl radicals. A proper formation will result in an anode coated with a film so highly resistant to conversion to the hydroxide form that it will have the same capacity whether exposed to dry air or to air saturated with moisture. Hydration of the film causes an increase of capacity, power loss, and leakage current, and thus causes deterioration of the film. Hence the high degree of resistance to hydration (conversion to hydroxide form) is advantageous as it follows that this type of film possesses a high degree of resistance to deterioration.

The outer layer on this double-layer type of anode described by me is in the nature of an "inactive" layer and affords a protective layer or coating for the underimposed active dielectric layer. This type of layer may be formed upon an aluminum or like filming-metal surface by electrolyzing the metal, as an anode, in a solution of sulfuric or phosphoric acid, for example, or in other ways. It likewise is a compound of the anode metal. When superposed over an active type of film it is relatively conductive, even at low voltages, in the presence of hydroxyl ions, such as contained in an electrolyte, and does not function as a dielectric layer. Only when dry, and hence non-hydrated, is the outer layer highly insulating. That is, the layer is highly hydratable and when in the hydrated condition it operates as a porous conductive coating, the conductivity depending largely upon the degree of hydration.

In forming a double-layer anode of the type described above, the anode metal, such as aluminum, is first coated with the highly hydratable, conductive coating, thoroughly washed, and then electrolyzed in a solution of boric acid and borax, or the like, to produce the active dielectric film beneath the conductive coating. The order of steps is irreversible; that is, the conductive coating cannot be produced on top of the highly insulating dielectric film, but must be produced first and then be underimposed by the active dielectric film. The conductive coating may be made of any desired thickness when formed by electrolysis, since a characteristic of this type of film is that its thickness is not limited by the applied voltage, except at low voltages, but can be regulated, and is dependent upon the concentration and temperature of the electrolyte, the current density, and duration of treatment. Preferably, the conductive coating is formed to a thickness of no more than $\frac{1}{1000}$ mm. when, if properly made, it has the appearance of a tough skin.

Further details of this type of anode are described in my copending application, Ser. No. 560,141, filed August 29, 1931, in which the same is claimed.

It is of course necessary, as a practical proposition, to employ a film-forming or film-maintaining electrolyte in connection with the filmed anode, in order to restore the film at points where it breaks down in service, and to maintain it at a high degree of efficiency.

As previously pointed out, deterioration of dielectric films is caused by gradual hydration of the film. In the case of a filmed anode employed in an electrolyte, the extent of hydration will depend upon the resistance of the film to hydration and upon the tendency of the electrolyte to produce hydration. Even with a properly formed active type of film, hydration, and hence deterioration, will occur when it is exposed to ordinary aqueous electrolytes, due to the high concentration and mobility of the hydroxyl ions in such an electrolyte. Alternating current operation greatly increases the rate of deterioration due to the increased motion of the molecules in the film, produced by the alternating potential, which facilitates introduction of hydroxyl radicals and hence conversion into the hydroxide form. In the latter case the application of a strong negative bias to the electrolyte will slow down the rate of deterioration by maintaining the electrolyte strongly negative with respect to the filmed electrode, but this necessitates auxiliary equipment. Deterioration will occur at different rates for different electrolytes, depending upon the hydroxyl ion concentration and mobility.

In order to reduce the deterioration of anodes to the very minimum, I employ, in accordance with my invention, an extremely high viscosity, semi-dry, film-forming electrolyte. The viscosity and dryness of this electrolyte are such that the number and mobility of the hydroxyl ions present in the electrolyte are insufficient to cause any appreciable deterioration of the dielectric film on anodes used in conjunction therewith even in the case of alternating current operation without a superposed negative bias.

In the preferred form of my invention, the electrolyte is comprised of two principal components—a high specific resistance film-forming composition, and a non-ionic conductive filler mixed therewith; as is illustrated in Fig. 2.

The preferred film-forming composition consists of an extremely high viscosity, homogeneous, film-forming electrolyte composition, characterized by having a plastic consistency and a low water and hydroxyl ion content, whereby it possesses an extremely high specific resistance. This composition may be comprised of one or several ingredients.

By "film-forming", I mean the ability to form or maintain the dielectric film on the anode. In the case of the double-layer type of anode, previously described, the dielectric film is the underlying, highly insulating, layer or film.

By "plastic consistency", I mean the consistency of a coherent, amorphous semi-solid, which may range in consistency from being able to flow very slowly under gravity from a filled can tipped on its side, to being rubbery and pliant, or even fairly hard, in contradistinction to viscous liquids which do not retain their shape to any practical extent.

The plastic consistency of the film-forming composition is of importance both from the standpoint of causing a low mobility of the hydroxyl ions therein, and from the mechanical standpoint of making possible an electrolyte which will serve as self-sufficient spacing means for electrodes.

By "homogeneous", I do not mean that this film-forming composition necessarily consists of a single chemical compound, but that it is uniform and may be said to constitute a single phase, in contradistinction to compositions containing constituents in the form of crystals or discrete particles. While these latter are not excluded from the electrolyte, they do not form a part of the film-forming composition proper which is described herein.

The extremely high specific resistance of the film-forming composition is important from two standpoints. First, it affords a measure of the low number and mobility of hydroxyl ions, and consequently of the reduced tendency of the electrolyte to cause hydration or deterioration of the dielectric film on the anode. Second, I have found that the higher the specific resistance of any given type of electrolyte or other medium which contacts the surface of a dielectric film, the higher the sparking voltage of the dielectric film. Consequently the employment of an extremely high specific resistance film-forming composition, of the character described, permits of operation at high voltages without sparking, both in the case of the double-layer type of anode and in the case of anodes with a single film. When the double-layer type of anode is used, the low hydroxyl ion concentration and mobility in my electrolytes, indicated by the high specific resistance of the film-forming composition, will cause the outer layer to have a high specific resistance so that a high sparking voltage of the underimposed dielectric film is secured, although due to its thinness the net resistance of the outer layer will still be relatively low. The high specific resistance of the outer layer will be due both to the high specific resistance of the film-forming composition which permeates the layer and to the high specific resistance of the layer proper resulting from the partial degree of hydration obtaining when in equilibrium contact with the film-forming composition.

On the other hand, too high a specific resistance of the film-forming composition will mean that the concentration and mobility of the hydroxyl ions contained therein is too low to satisfactorily maintain the dielectric film. Also, when the double-layer type of anode is employed, the outer layer thereof will have such a high resistance, due to the resistance of the film-forming composition which permeates the layer and to the low degree of hydration of the layer, as to cause a substantial series-capacity effect, greatly lowering the capacity of the condenser, and an excessive power loss.

In accordance with my invention, I have found that it is desirable for the specific resistance of the film-forming composition to lie within the range of approximately 100,000 to 500,000 ohms/cm$^3$, and that the value should preferably be within the limits of about 150,000 to 300,000 ohms/cm$^3$. It will be understood that these values are given as illustrative, and not as a strict limitation for all cases.

The use of any high resistance electrolyte composition, without more, between the electrodes of an electrolytic condenser, will result in a high power loss in the condenser, due to the $I^2R$ loss in such an electrolyte. Furthermore, the $I^2R$ energy loss is transformed into heat, which may cause a substantial drying up of the electrolyte and may also cause the electrolyte to decompose and deteriorate. This is particularly pronounced in the case of condensers operated, continuously or for substantial lengths of time, on alternating current; and is one of the main reasons why such operation is unsuccessful.

Furthermore, if the electrolyte composition employed between the electrodes of a condenser has an extremely high resistance there will be a substantial reduction in the capacity of the condenser, due to the electrolyte stratum exerting a marked capacity effect in series with the capacity of the dielectric proper. The greater the resistance of the total electrolyte, the greater the reduction of capacity of the condenser. With a film-forming composition having the order of specific resistance which I prefer or higher, this effect will be so pronounced as to make prohibitive an electrolyte stratum of even 25 mils thickness, and will still be pronounced with an electrolyte stratum thickness of 2.5 mils. In addition, the extremely high resistance of such an electrolyte will not only cause a tremendous $I^2R$ power loss in the electrolyte, but will prevent the proper flow of current necessary in healing of the dielectric film.

In accordance with my invention, I avoid the harmful effects noted above by mixing a filler of conductive particles with the film-forming composition to comprise the electrolyte. In this manner the actual resistance of the electrolyte can be made extremely low even though the film-forming composition has a specific resistance of 100,000 ohms/cm$^3$ or higher.

However, an electrolyte containing conductive particles will greatly lower the sparking voltage of a dielectric film with which the conductive particles come in contact. This undesirable effect is avoided by employment of the double-layer type of anode which I have previously described. The combination is illustrated in Fig. 2. The overlying layer of such an anode is permeable to the film-forming composition but not to the conductive particles, and hence prevents the conductive particles in the electrolyte from coming in contact with the underimposed active dielectric film while permitting sufficient access of the film-forming component thereto. I do not mean that the overlying layer is necessarily permeable to the film-forming composition as a whole, since there will be a sufficient "permeability" if the layer is rendered conductive to the degree indicated in the foregoing description and if healing of the underlying active film is permitted.

Thus both the advantage of a high specific resistance film-forming composition and of a low resistance electrolyte are obtained. The low resistance of the electrolyte outside the outer layer of the electrode, and the low actual net resistance of the outer layer strata due to its extreme thinness, makes possible an electrolytic condenser having a low power loss and yet having the desirable characteristic resulting from use of the film-forming composition described above.

The combination of my electrolyte with the double-layer type of anode, as shown in Fig. 2, accordingly makes possible an electrolytic condenser characterized by having an exceptionally high sparking voltage; freedom from appreciable deterioration of the dielectric film, making unnecessary the use under any conditions of a superposed negative bias on the electrolyte; exceedingly low power loss; and absence of heating, even when operated from indefinitely long periods on alternating current. Particularly satisfactory results, especially for alternating current operation, are obtained by employing double-layer anodes produced according to the method described in my copending application Ser. No. 711,287 filed of even date herewith.

As illustrated in Fig. 1, a complete condenser unit consists of two electrodes and an interposed electrolyte, at least one of the electrodes being filmed and serving as an anode. For alternating-current use, both electrodes must be filmed since both function as anodes. A condenser may of course be made up of a number of such units, comprising a number of electrodes and interposed electrolyte strata, in which case the intermediate anodes would obviously be filmed on both sides.

Any other form of filmed electrode can be satisfactorily employed in association with my electrolyte, provided the dielectric film is kept from contact with the conductive filler particles by a suitable thin interposed high specific resistance strata impermeable to the conductive particles but permeable to the film-forming component, thereby permitting healing of the dielectric film but avoiding reduction of sparking voltage.

The conductive filler may consist of lamp black, graphite, other forms of carbon, platinum black, or mixtures thereof, for example, or other materials which will be relatively conductive in the presence of a film-forming composition. Ground charcoal can be used, but due to the non-flaky character of the particles will not reduce the resistance of the electrolyte as much as will flaky forms of carbon, such as lamp black and graphite. Most metals are unsatisfactory, due to becoming polarized or filmed in the presence of the film-forming composition, and in consequence acting as high resistance, or insulating, fillers, rather than as conductive fillers. Powdered aluminum or copper, for example, will function as a substantially insulating filler.

I prefer to use lamp black as the conductive filler, as it is not only quite conductive, but greatly increases the cohesiveness of the electrolyte mixture. According to the percentage of lamp black added to the film-forming composition and the particular film-forming composition used, the specific resistance of my electrolytes can be made as low as of the order of 1,000 ohms/cm$^3$, and in some cases as low as 100 ohms/cm$^3$, notwithstanding the extremely high specific resistance of the film-forming composition. A mixture of lamp black and graphite will also work quite satisfactorily.

In the following description I will set forth a number of specific kinds of film-forming composition for the electrolyte, but it will be understood that I do so for purposes of illustration rather than limitation.

Use is made by me of highly polymerized plastic reaction products of water soluble polyhydric alkyl compounds and water soluble polybasic film-forming acids, as an ingredient of my preferred film-forming composition. These products are esters which are polymerized by the interlinking of molecules into complex forms made possible by the presence of a plurality of replaceable radicals in both the polyhydric and polybasic materials utilized.

The greater the number of hydroxyl and hydrogen radicals taking part in the esterification and polymerization, the greater the viscosity of the product as compared with that of the polyhydric alkyl compound employed; and this applies to hydroxyl radicals in the acid when a hydroxy-acid is used, since esterification can occur between such acid molecules.

I prefer to use the lower and less complex polyhydric alcohols, including both straight alcohols and alcohol ethers; such as the simple glycols, for example diethylene glycol; and glycerol; but higher polyalkyl and polyhydric water soluble alcohols such as pentaerythrol, sorbitol, mannitol and dulcitol may also be used.

As examples of polybasic film-forming acids for use in this connection, I may mention boric acid; and water soluble film-forming hydroxy polycarboxylic acids, such as citric acid and tartaric acid. Each of these acids will produce truly plastic reaction and polymerization products.

Succinic acid is an example of a film-forming dibasic acid containing no hydroxyl radicals. It will form a plastic product with glycerol (trihydric), but with diethylene glycol (dihydric) it will form a viscous product which is not plastic. In the latter case a plastic product can be obtained by employing a more complex acid in conjunction with the succinic acid.

It will be evident that by employing mixtures of acids it is possible to obtain products of various degrees of plasticity from any given polyhydric compound.

I prepare the polymerized, plastic, reaction product by mixing the selected polyhydric compound and polybasic acid in approximately molecular proportions such that there is one hydroxyl (OH) radical to each acid (H) radical. This proportionality may be varied within fairly wide limits. By employing an excess of the polyhydroxy compound above that required for a strictly molecular proportionality, the final product can be made softer, which is desirable in the case of products which otherwise might be harder than desirable. Too great an excess of the polyhydric compound should be avoided as it will prevent the final product from having the desired degree of plasticity. Too great an excess of acid should be avoided in order to prevent acid crystals from being present in the final cooled product, rendering it non-homogeneous.

The mixture is heated and during this heating the boiling point rises. The temperature is maintained at the boiling point until a boiling point is reached at which sufficient polymerization has occurred so that the product upon cooling to room temperature will be a homogeneous plastic material. Heating will, in general, be required for a period of one to four hours, depending upon the rate at which heat is supplied to the mixture.

By employing a suitable catalyst the polymerization can be facilitated.

Water will be produced as one product, but will be largely driven out by the prolonged heating, and hence the product may be termed semi-dry.

These plastic reaction and polymerization products are all hygroscopic to a greater or less degree, depending upon the particular product, and hence do not dry out when exposed to the atmosphere. They will, in consequence, maintain a balanced water content and need not be employed in sealed containers, and for this reason may be termed non-drying.

The products produced in the manner described above, while film-forming, do not possess a sufficient hydroxyl ion concentration to come within the preferred limits of specific resistance of the film-forming composition which I have set forth. The specific resistance in each case is greatly in excess of 500,000 ohms/cm$^3$, at room temperature.

I increase the hydroxyl ion concentration by adding to the plastic product a small amount of a water soluble alkali salt of a film-forming acid, such as borax, sodium citrate, sodium tartarate, etc.; or a water soluble base, such as sodium hydroxide or potassium hydroxide or other alkali hydroxide; with or without the addition of a small amount of water. It is generally necessary to employ a small amount of water, due to the high degree of dryness of the plastic product resulting from the prolonged heating, the amount depending upon the extent of heating. The use of a salt, rather than a base, is preferred, since bases will often produce a certain amount of saponification. In this manner the specific resistance of the film-forming composition, at room temperature can be adjusted to within the preferred limits of 100,000 to 500,000 ohms/cm$^3$, and I ordinarily adjust the hydroxyl ion concentration so that the specific resistance will lie within the limits of 150,000 to 300,000 ohms/cm$^3$.

The specific resistance of the plastic product is not of course solely dependent upon the concentration and mobility of the hydroxyl ions therein, but by proceeding in the manner which I have described the specific resistance can be made use of as an indicator to secure the preferred film-forming composition for my electrolyte.

The addition of more than a small amount of water should be avoided, irrespective of its effect on the specific resistance of the plastic product, since the more water added the greater the reduction of plasticity, and it is desirable to retain this plasticity for mechanical reasons. Furthermore, if too much water is added, substantial hydrolysis of the film-forming composition may occur; and evaporation of water will occur when the electrolyte is exposed to the atmosphere in use; resulting in a lack of stability.

One way of incorporating the source of hydroxyl ions in the plastic product is to heat the latter until fluid, usually requiring a temperature of 90°–100° C., and then stir in a solution of the salt or base dissolved in a small amount of water. It will be understood that the added solution must be comparatively stable at the temperature required. An ammonia solution, for example, cannot be used satisfactorily, as most of the ammonia will be driven out owing to its low solubility at elevated temperatures.

The addition of these materials to the plastic product does not result in a non-homogeneous film-forming composition, since sufficient material will dissolve therein to make possible the desired adjustment of specific resistance, and it is evident that undissolved materials will not produce an increase of hydroxyl ion concentration.

I have specified the use of a salt of a film-forming acid, since it is undesirable for the electrolyte to contain any ingredient which will interfere with the desired film-forming properties of the electrolyte, or which will have a deleterious action upon the dielectric film. Chlorides, sulfates, and phosphates, for example, should be avoided, as they will gradually cause an active film, of the boric acid borax type, to be transformed into an inactive type of film, and will prevent proper reforming or healing of the film.

The following examples are given as illustrative, without any intent to be limited by the ingredients, proportions, or procedures described.

Example 1

A citric acid type of plastic product can be prepared by mixing together 58%, by weight, of diethylene glycol and 42% of citric acid. The mixture is stirred and heated to a temperature of from 180–190° C., the heating being continued until polymerization has progressed to the point where the product will be plastic when cooled to room temperature.

In this way an adhesive rubbery, hygroscopic composition can be secured.

The specific resistance will be extremely high at room temperature (taken as about 25° C.), amounting to several million ohms/cm³, or more. Even with the addition of 12% of water to the product, the specific resistance will be in the neighborhood of 1,000,000 ohms/cm³. For this reason it is desirable, in accordance with my invention, to add a base or suitable salt, or to otherwise lower the specific resistance by adding an agent to produce additional hydroxyl ions.

A similar adhesive rubbery hygroscopic composition can be prepared by employing tartaric acid in place of citric acid.

Example 2

A boric acid type of plastic product can be prepared by heating a mixture of 62% by weight of glycerol and 38% of boric acid. Polymerization occurs at about 170° C. Several hours of heating will ordinarily be required to obtain a product boiling between 170–175° C., at which temperature polymerization readily occurs to produce a plastic product.

An adhesive, hygroscopic, plastic mass is secured having a specific resistance of about 710,000 ohms/cm³ at 25° C.

The resistance can be lowered to within the desirable range by adding, for example, a solution of equal parts by weight of water and borax, 5% of each relative to the weight of glycerol, both the plastic product and solution being heated to about 100° C. and stirred together. The plastic composition will now be found to have a specific resistance of about 165,000 ohms/cm³ at 25° C.

Example 3

It is not necessary to first obtain a plastic product, and then lower the resistance thereof by subsequent treatment, in the manner just described. Instead, a suitable salt or base can be added to the original mixture of polyhydric compound and acid, and the whole mixture heated to produce a plastic composition which will have initially the desired resistance.

A satisfactory composition can be obtained, for example, by heating together 50%, by weight, of diethylene glycol, 23% of boric acid, and 27% of sodium tetraborate.

The sodium tetraborate not only reduces the resistance, but acts as a "flux" which facilitates and hastens the polymerization of the diethylene glycol and boric acid. The product will be of a softer consistency than if the sodium tetraborate had not been used, but will be of a plastic consistency, and adhesive.

A product of this type will be found to have a specific resistance of about 175,000 ohms/cm³ at 22° C.

Example 4

Many desirable combinations of two or more plastic compositions can be employed to advantage.

For example, the plastic products of diethylene glycol and citric or tartaric acid possess a rubbery consistency, but have a higher specific resistance and lower degree of hygroscopicity than is desirable, and are not as adhesive as I prefer.

The type of composition made from diethylene glycol, boric acid, and sodium tetraborate, on the other hand, has a desirable specific resistance and degree of hygroscopicity, and is plastic and highly adhesive. But this type is not as stiff, or viscous, as I prefer; and is characterized by hydrolyzing in the presence of atmospheric moisture, evidenced by the formation of "tear drops" of diethylene glycol on the exposed surface. In actual use, exposed to the atmosphere, hydrolyzation can be inhibited by employing sealing means for the purpose of preventing the products of hydrolyzation from dripping away, thereby establishing an equilibrium, but this necessitates additional elements of condenser construction.

By combining the rubbery type of composition with the latter type, a composition can be obtained which is rubbery and highly adhesive, has the preferred specific resistance and degree of hygroscopicity, and will be free from tear drops.

This combination composition may contain as much as 96–97% of the rubbery type of composition, as comparatively little of the boric acid borate type is required in order to reduce the specific resistance to an advantageous amount.

However, the boric acid borate type of composition is the most inexpensive and hence I prefer to use as much of it as possible, keeping the proportion within limits such that the valuable feature of the rubbery type of composition will not be lost. I have found that a 2 to 1 ratio, by weight, between the boric acid borate type and the tartaric acid type works quite well. The citric acid type is much more rubbery in consistency, and harder, than the tartaric acid type; and for this reason a 4 to 1 ratio between the boric acid borate type and the citric acid type can be used to advantage.

The effect of mixing the boric acid borate type with the rubbery type, with respect to decreasing the specific resistance of the mixture, does not increase in proportion to the amount used. A comparatively small amount causes a large drop in specific resistance, and greatly improves its electrical character, especially its forming property; thereafter the specific resistance decreasing slowly toward that of the boric acid borate type as a limit.

The boric acid borate type of composition and the citric or tartaric acid type need not be prepared separately and then mixed, to secure the combination type of composition just described. The latter can be prepared initially by reacting and polymerizing a mixture of polyhydric alcohol, boric acid, borate, and citric or tartaric acid.

It will be evident that many other combinations can be used in keeping the principles which I have described.

The various compositions can be used alone in some special applications, without the admixture of a conductive filler, but with the attendant disadvantages which I have indicated in stating the reasons for using a conductive filler.

The specific resistance can be lowered below the 100,000 ohms/cm³ lower limit which I have specified as preferable, by the addition of ionogen material, but with a corresponding loss of the desirable properties attendant upon the high specific resistance type.

*Illustrative complete electrolyte*

I will now describe in some detail the preparation of an illustrative embodiment of my preferred electrolyte, containing both a plastic film-forming composition and a filler of conductive particles.

The plastic film-forming composition is comprised of about four parts of the plastic composition prepared from diethylene glycol, boric acid and sodium tetraborate, as set forth in Example 4, and about one part of the rubbery composition prepared from diethylene glycol and citric acid, as set forth in Example 1. The first named constituent is heated to a temperature somewhat in excess of 100° C., giving it a syrupy consistency, and is placed in a kneading machine provided with a hot water heating jacket to maintain the temperature near 100° C., and the rubbery constituent is then added. The heated mixture is then kneaded together for five to ten minutes. The specified kneading and heating will cause the rubbery constituent to become somewhat softened and to break up into globules which will slowly diminish in size. The mixture can be made uniform by much more prolonged heating and kneading, but a simpler way is made possible by the mechanical action of the lamp black filler which is added next.

The kneading is continued and lamp black is slowly added until a material is secured containing 25%, by weight, of lamp black. The lamp black appears to anchor itself in the rubbery globules, and causes them to distintegrate as the kneading progresses, thereby producing a uniform mixture.

The resultant electrolyte is exceedingly stiff, even at the kneading temperature, and upon cooling to room temperature will be found to be a black, adhesive, rubbery material which can be worked up into thin, pliant, coherent sheets of sufficient toughness and strength to be handled as such. The specific resistance of the electrolyte will be in the neighborhood of 1000 ohms/cm³ or less.

The content of lamp black can be successfully varied within wide limits. Too little lamp black will not produce the proper low conductivity and toughness. Too much lamp black will render the electrolyte too dry and not properly coherent and adhesive, and will not permit of proper contacting with electrodes. I have found that from 10–40% of lamp black can be used satisfactorily.

Condensers can be assembled by simply sandwiching aluminum electrode sheets and sheets of electrolyte. The anode electrodes are preferably of the double layer type, in order to best secure the advantages which I have described.

As the electrolyte is quite adhesive, does not flow even under considerable pressure, does not dry out or hydrolyze when exposed to the atmosphere, and is sufficiently hygroscopic to maintain the proper moisture content in the presence of the atmosphere; no additional spacing or securing means are required between the electrodes even when the electrodes have raw (unformed) edges, no means are required to keep the electrolyte or its constituents from flowing or dripping from between the electrodes, and no casing or container is needed. Furthermore, the employment of very thin electrolyte strata is made possible, resulting in an extremely low net resistance.

After assembly of the electrode sheets and interleaved sheets of electrolyte, the whole is compressed between two flat surfaces, as in an arbor press, in order to secure a good contact between the sheets of electrolyte and adjacent electrodes, and to produce firm adhesion therebetween.

Because of the mechanical strength and simplicity of such an assembly, the electrode sheets may be formed of thin aluminum foil and the electrolyte may have a thickness of only 2-4 mils, making for great overall compactness and economy of material.

The electrolyte may be formed into the desired thin sheets by extruding the electrolyte from a slit orifice of the desired width, at an elevated temperature which will permit the electrolyte to flow under a reasonable pressure. The electrolyte may also be heated and rolled into sheets. Another procedure is to mold the electrolyte into a slab or column of the desired cross-section, chill it to reduce adhesiveness, and slice it. A sheet of electrolyte can then simply be laid on an electrode sheet, and pressed into intimate contact therewith to secure a firmly adherent coating of electrolyte on the electrode.

It is also a simple matter to add to the electrolyte methyl alcohol, or like volatile solvent, to produce a liquid which can be sprayed or painted on an electrode sheet, or the electrode sheet can be dipped therein and thus coated. In order to obtain the proper fluidity so that a thin coating will be obtained on dipped sheets, it is generally necessary to employ such an amount of methyl alcohol that the lamp black will partially settle on standing, and hence the mixture should of course be agitated so that it will be uniform during application. Care should be taken not to agitate in such a way as to result in an uneven coating when the dipping method is used. The methyl alcohol can be easily evaporated off and a firmly adherent coating of the electrolyte will be left on the electrode. For example, dipped electrodes can be passed through a heated tunnel, being allowed to heat up for 5 to 10 minutes to a temperature of 80–100° C., which will drive out the methyl alcohol.

A thin aluminum electrode foil, coated with electrolyte, can be handled like a piece of thin flexible leather, and hence may be readily handled in the assembly of a condenser, either of the stacked or coiled type; or conveniently marketed as an article.

What I claim is as follows:

1. In an electrolytic condenser, the combination of an electrode having a dielectric film, an electrolyte composed of a film-forming composition of a specific resistance of about 100,000–500,000 ohms/cm³ mixed with a conductive filler, and thin high specific resistance means permeable to the film-forming composition separating the dielectric film from the conductive filler.

2. In an electrolyte condenser, the combination of an electrode having a dielectric film, an electrolyte comprised of a film-forming composition of a specific resistance of about 150,000–300,000 ohms/cm³ mixed with a conductive filler, whereby the electrolyte has a specific resistance of the order of about 1000 ohms/cm³ and thin high specific resistance means interposed between the dielectric film and the electrolyte impermeable to said conductive filler and permeable to said film-forming composition to permit healing of the dielectric film.

3. In an electrolytic condenser, the combination of an electrode having a dielectric film, an electrolyte comprising a film-forming composition of a specific resistance in excess of about 100,000 ohms/cm³ mixed with a conductive filler, and thin high specific resistance means separating the dielectric film from the conductive filler while permitting healing of the dielectric film, whereby an extremely high sparking voltage and lower power loss characteristic is obtained.

4. In an electrolytic condenser, an electrolyte comprised of a homogeneous plastic semi-dry non-drying film-forming composition having a high order of specific resistance, and a conductive filler distributed therethrough to impart a low order of specific resistance, said electrolyte being employed in association with at least one filming anode of the type having a proximate dielectric film covered by an integral high specific resistance protective layer permeable to the film-forming composition and impermeable to said conductive filler.

5. In combination with a filming-metal member having a highly insulating dielectric film protected by a superposed integral highly hydratable layer, an electrolyte comprising a homogenous plastic semi-dry film-forming composition having a high order of specific resistance mixed with a conductive filler having a low order of specific resistance.

6. In an electrolytic condenser, an electrolyte containing a high viscosity film-forming composition characterized by a hydroxyl ion concentration adjusted to impart to said film-forming composition a specific resistance of about 100,000–500,000 ohms/cm³.

7. In an electrolytic condenser, an electrolyte containing a high viscosity film-forming composition characterized by a hydroxyl ion concentration adjusted to impart to said film-forming composition a specific resistance of about 150,000–300,000 ohms/cm³.

8. In an electrolytic condenser, an electrolyte containing a homogeneous semi-dry non-drying plastic film-forming composition characterized by a specific resistance of about 100,000–500,000 ohms/cm³ stably maintained in the presence of atmospheric moisture.

9. In an electrolytic condenser, an electrolyte containing a semi-dry non-drying plastic film-forming composition characterized by a specific resistance of about 150,000–300,000 ohms/cm³ stably maintained in the presence of atmospheric moisture.

10. For use in electrolytic condensers as a film-forming agent and electrode spacing and securing means, an electrolyte comprised of an adhesive rubbery plastic film-forming composition of a specific resistance in excess of about 100,000 ohms/cm³ mixed with sufficient lamp black to permit working said electrolyte into thin pliant coherent non-flowing sheets having a low specific resistance.

11. For use in electrolytic condensers as a film-forming agent and electrode spacing and securing means, an electrolyte comprised of an adhesive semi-dry plastic film-forming composition having a high order of specific resistance mixed with sufficient lamp black to impart a low order of specific resistance to the electrolyte and to permit using the latter as a coherent non-flowing coating for electrodes.

12. In an electrolytic condenser, a film-forming composition comprising as a principal ingredient a homogeneous plastic reaction and polymerization product of a water soluble polyhydric alkyl compound and a water soluble polybasic film-forming acid.

13. In an electrolytic condenser, a film-forming composition comprising as a principal ingredient a plastic adhesive homogeneous reaction and polymerization product of a lower polyhydric alcohol and a water soluble polybasic film-forming acid.

14. In an electrolytic condenser, a film-forming composition comprising as a principal ingredient a plastic adhesive homogeneous reaction and polymerization product of a lower polyhydric alcohol and a water soluble film-forming hydroxy polycarboxylic acid.

15. In an electrolytic condenser, a film-forming composition comprising as a principal ingredient a plastic adhesive homogeneous reaction and polymerization product of a lower polyhydric alcohol and boric acid.

16. In an electrolytic condenser, a film-forming composition comprising as a principal ingredient a plastic adhesive homogeneous reaction and polymerization product of an alcohol of the class consisting of diethylene glycol and glycerol and an acid of the class consisting of boric acid, citric acid, and tartaric acid.

17. In an electrolytic condenser, a plastic film-forming composition according to claim 12 having a specific resistance not less than about 100,000 ohms/cm³.

18. In an electrolytic condenser, a plastic film-forming composition according to claim 13 having a specific resistance not less than about 100,000 ohms/cm³.

19. In an electrolytic condenser, a plastic film-forming composition according to claim 14 having a specific resistance of about 100,000–500,000 ohms/cm³.

20. In an electrolytic condenser, a plastic film-forming composition according to claim 31 having a specific resistance of about 100,000–500,000 ohms/cm$^3$.

21. In an electrolytic condenser, a film-forming composition having a specific resistance of about 150,000–300,000 ohms/cm$^3$ and comprised essentially of a plastic adhesive homogeneous reaction and polymerization product of an alcohol of the class consisting of diethylene glycol and glycerol and an acid of the class consisting of boric acid, citric acid, and tartaric acid.

22. In an electrolytic condenser, a plastic film-forming composition comprised essentially of a plastic adhesive homogeneous reaction and polymerization product of an alcohol of the class consisting of diethylene glycol and glycerol and at least one acid of the class consisting of boric acid, citric acid, and tartaric acid; having a specific resistance substantially in excess of 500,000 ohms/cm$^3$; with sufficient admixed material of the class consisting of water soluble bases and alkali salts of film-forming acids to impart to said composition a reduced specific resistance not less than about 100,000 ohms/cm$^3$.

23. In an electrolytic condenser, a plastic film-forming composition comprised of a rubbery homogeneous film-forming reaction and polymerization product of a lower polyhydric alcohol and an acid of the class consisting of citric acid and tartaric acid, said polymerization product being present in sufficient amount to impart a rubbery consistency to said composition.

24. In an electrolytic condenser, a plastic film-forming composition comprised of a plastic homogeneous reaction and polymerization product of boric acid and a lower polyhydric alcohol, present in sufficient amount to impart substantial adhesiveness and hygroscopicity, with sufficient admixed sodium tetraborate to impart to said composition a substantially reduced specific resistance not less than about 100,000 ohms/cm$^3$.

25. For use in electrolytic condensers, a semi-dry rubbery adhesive film-forming composition comprised essentially of a homogeneous mixture of a rubbery reaction and polymerization product of a lower polyhydric alcohol and an acid of the class consisting of citric acid and tartaric acid, a plastic adhesive reaction and polymerization product of a lower polyhydric alcohol and boric acid, and sufficient salt of a film-forming acid to impart to said composition a specific resistance of about 100,000–500,000 ohms/cm$^3$.

26. For use in electrolytic condensers, a semi-dry rubbery adhesive film-forming composition comprised essentially of a homogeneous mixture of a rubbery reaction and polymerization product of diethylene glycol and an acid of the class consisting of citric acid and tartaric acid, and a plastic adhesive reaction and polymerization product of diethylene glycol, boric acid, and sodium tetraborate.

27. An electrolyte adapted for use in electrolytic condensers as a film-forming agent and electrode spacing means, comprising as a principal ingredient a plastic homogeneous reaction and polymerization product of a water soluble polyhydric alkyl compound and a water soluble polybasic film-forming acid, and an admixed conductive filler.

28. An electrolyte adapted for use in electrolytic condensers as a film-forming agent and electrode spacing means, comprising as a principal ingredient a semi-dry plastic adhesive homogeneous reaction and polymerization product of a lower polyhydric alcohol and an acid of the class consisting of boric acid, citric acid, and tartaric acid; containing sufficient material of the class consisting of water soluble bases and alkali salts of film-forming acids to impart to said plastic product a substantially reduced specific resistance not less than about 100,000 ohms/cm$^3$; and sufficient admixed lamp black to impart to the electrolyte a low order of specific resistance and a high coherency.

29. An electrolyte adapted for use in electrolytic condensers as a film-forming agent and electrode spacing means, comprising a semi-dry adhesive rubbery film-forming composition consisting essentially of a plastic reaction and polymerization product of a lower polyhydric alcohol and boric acid and a rubbery reaction and polymerization product of a lower polyhydric alcohol and an acid of the class consisting of citric acid and tartaric acid, said composition containing sufficient hydroxyl ions to have a specific resistance of about 100,000–500,000 ohms/cm$^3$; and about 10–40% of admixed lamp black.

30. The combination comprising an aluminum member having a highly insulating proximate dielectric film and an integral superposed layer of a highly hydratable aluminum compound coated with a firmly adherent non-flowing electrolyte comprised of a homogeneous mixture of a plurality of film-forming plastic reaction products of lower polyhydric alcohols, at least one of which products imparts a rubbery consistency to said electrolyte and at least one of which imparts a high adhesiveness, and admixed lamp black imparting a low order of specific resistance and high coherency to the electrolyte.

31. An article comprising an aluminum foil having a highly hydratable integral layer of an aluminum compound coated with a thin firmly adherent pliant layer of a semi-dry non-drying non-flowing electrolyte comprised essentially of a high specific resistance plastic adhesive homogeneous mixture containing a plurality of film-forming plastic reaction products of polyhydric alcohols and the like, at least one of which products imparts a rubbery consistency to said mixture and at least one of which imparts a high adhesiveness, and admixed lamp black imparting a low order of specific resistance and high coherency to the electrolyte.

32. An article comprising an aluminum foil having a highly hydratable integral layer coated with a thin firmly adherent pliant layer of a semi-dry non-flowing electrolyte comprised of a rubbery adhesive film-forming composition of a specific resistance of 100,000–500,000 ohms/cm$^3$ and a lamp black filler imparting a low order of specific resistance and a high coherency to the electrolyte.

33. In an electrolytic condenser, a film-forming composition consisting of a plastic reaction and polymerization product of a water soluble polyhydric alkyl compound and a water soluble polybasic film-forming acid, containing a small amount of water.

34. In an electrolytic condenser, a film-forming composition consisting of a plastic reaction and polymerization product of a lower polyhydric alcohol and boric acid, containing a small amount of water.

35. In an electrolytic condenser, a film-forming composition consisting of a plastic reaction and polymerization product of diethylene glycol and boric acid, containing a small amount of water.

36. In an electrolytic condenser, a film-forming composition consisting of a plastic reaction and polymerization product of a water soluble polyhydric alkyl compound and a water soluble polybasic film-forming acid, containing a small amount of water, and a finely divided filler.

37. In an electrolytic condenser, a film-forming composition consisting of a plastic reaction and polymerization product of a lower polyhydric alcohol and boric acid, containing a small amount of water, and a finely divided conductive filler.

38. For use in electrolytic condensers and the like, a film-forming composition consisting of a plastic reaction and polymerization product of diethylene glycol and boric acid, containing a small amount of water, and admixed lamp black.

JULIUS EDGAR LILIENFELD.

CERTIFICATE OF CORRECTION.

Patent No. 1,986,779.  January 1, 1935.

JULIUS EDGAR LILIENFELD.

It is hereby certified that error appears in the printed specification of the above numbered patent requiring correction as follows: Page 8, first column, line 1, claim 20, for the claim numeral "31" read 15; and that the said Letters Patent should be read with this correction therein that the same may conform to the record of the case in the Patent Office.

Signed and sealed this 19th day of February, A. D. 1935.

Leslie Frazer
Acting Commissioner of Patents.

(Seal)